(12) United States Patent
Alvarez Valenzuela et al.

(10) Patent No.: US 10,333,309 B2
(45) Date of Patent: Jun. 25, 2019

(54) ELECTRICAL ARRANGEMENT COMPRISING SUB-MODULES

(71) Applicant: SIEMENS AKTIENGESELLSCHAFT, Munich (DE)

(72) Inventors: Rodrigo Alonso Alvarez Valenzuela, Nuremberg (DE); Martin Pieschel, Nuremberg (DE); Ervin Spahic, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 35 days.

(21) Appl. No.: 15/568,609

(22) PCT Filed: Apr. 23, 2015

(86) PCT No.: PCT/EP2015/058781
§ 371 (c)(1),
(2) Date: Oct. 23, 2017

(87) PCT Pub. No.: WO2016/169597
PCT Pub. Date: Oct. 27, 2016

(65) Prior Publication Data
US 2018/0145510 A1    May 24, 2018

(51) Int. Cl.
*H02M 1/32* (2007.01)
*H02M 7/483* (2007.01)
(Continued)

(52) U.S. Cl.
CPC .......... *H02J 3/1842* (2013.01); *H02J 3/1857* (2013.01); *H02J 7/0029* (2013.01); *H02M 1/32* (2013.01); *H02M 7/483* (2013.01); *H02M 2001/325* (2013.01); *H02M 2007/4835* (2013.01); *Y02E 40/26* (2013.01)

(58) Field of Classification Search
CPC .. H02M 1/32; H02M 2001/325; H02M 7/483; H02M 2007/4835; H02J 3/1842
See application file for complete search history.

(56) References Cited

U.S. PATENT DOCUMENTS

| | | |
|---|---|---|
| 8,531,055 B2 | 9/2013 | Adest et al. |
| 2007/0216390 A1* | 9/2007 | Wai ...................... H02M 3/158 323/351 |

(Continued)

FOREIGN PATENT DOCUMENTS

| | | |
|---|---|---|
| EP | 2698912 A2 | 2/2014 |
| WO | 2009073868 A1 | 6/2009 |

(Continued)

Primary Examiner — Jue Zhang
Assistant Examiner — David A. Singh
(74) Attorney, Agent, or Firm — Laurence Greenberg; Werner Stemer; Ralph Locher

(57) ABSTRACT

An arrangement includes at least one series circuit having at least two series-connected submodules and an inductor. At least one of the submodules in one or a plurality of the series circuits has a step-up/step-down converter and a storage module. A protective module with at least one actuator is electrically connected between the step-up/step-down converter and the storage module. A method for operating the arrangement is also provided.

9 Claims, 10 Drawing Sheets

(51) Int. Cl.
*H02J 3/18* (2006.01)
*H02J 7/00* (2006.01)

(56) References Cited

U.S. PATENT DOCUMENTS

| | | |
|---|---|---|
| 2012/0018777 A1 | 1/2012 | Takizawa |
| 2012/0229080 A1 | 9/2012 | Leu et al. |
| 2014/0042817 A1 | 2/2014 | Zargari et al. |
| 2014/0104899 A1 | 4/2014 | Fischer et al. |
| 2014/0175888 A1 | 6/2014 | Deboy |
| 2014/0226377 A1* | 8/2014 | Goetz .................. H02M 3/158 363/65 |
| 2016/0056710 A1 | 2/2016 | Haefner et al. |
| 2016/0368392 A1* | 12/2016 | Braun ................. B60L 11/1855 |

FOREIGN PATENT DOCUMENTS

| | | |
|---|---|---|
| WO | 2011060823 A1 | 5/2011 |
| WO | 2012156261 A2 | 11/2012 |
| WO | 2014169958 A1 | 10/2014 |

* cited by examiner

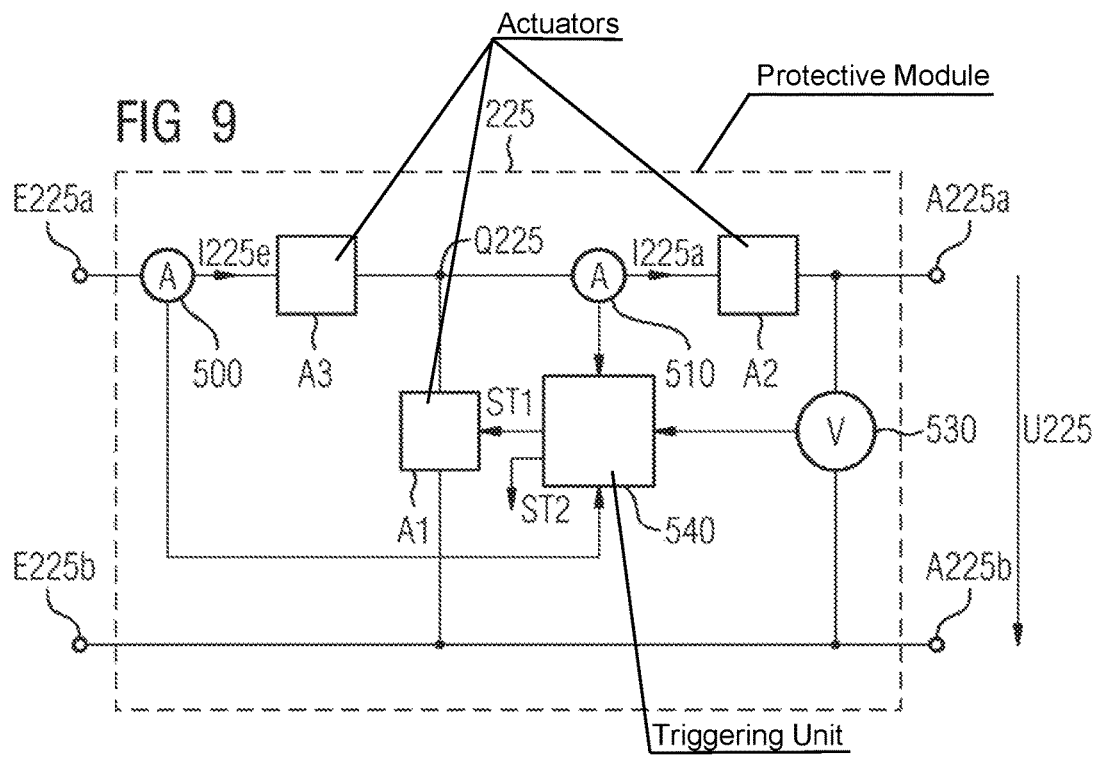
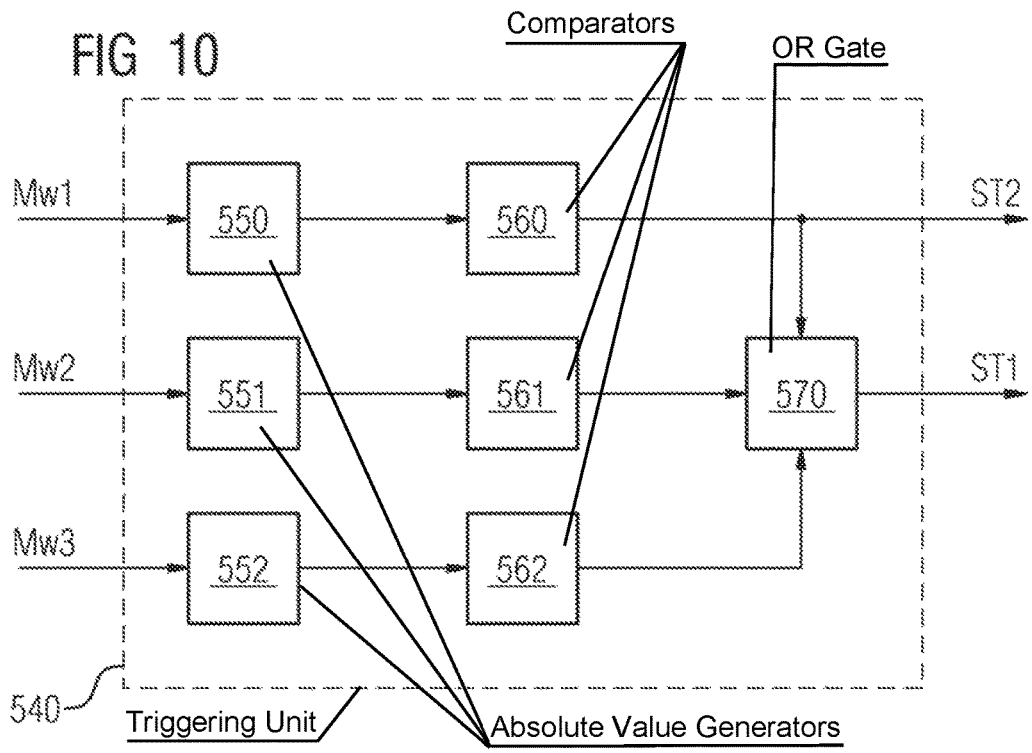

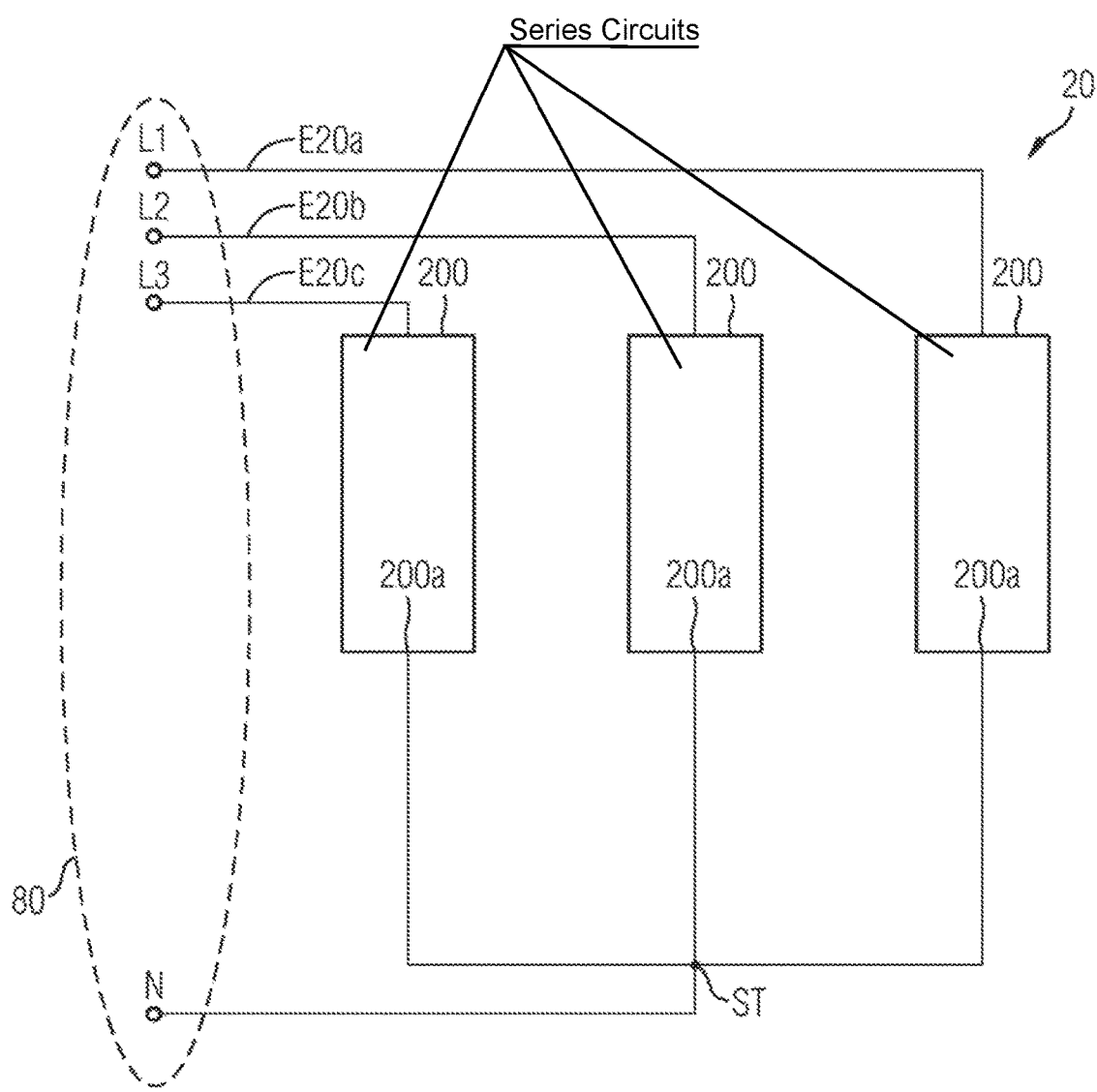

ELECTRICAL ARRANGEMENT COMPRISING SUB-MODULES

BACKGROUND OF THE INVENTION

Field of the Invention

The present invention relates to an arrangement which comprises at least one series circuit including at least two series-connected submodules and an inductor.

A corresponding arrangement is described in international patent application WO 2012/156261 A2. This arrangement relates to a multi-level converter.

SUMMARY OF THE INVENTION

The object of the present invention is to improve an arrangement of the kind initially specified with respect to operational reliability.

This object is achieved according to the present invention via an arrangement having at least one series circuit including at least two series-connected submodules and an inductor. Advantageous embodiments of the arrangement according to the present invention are provided in the sub claims.

Accordingly, it is provided according to the present invention that at least one of the submodules of one or a plurality of the series circuits includes a step-up/step-down converter and a storage module, and a protective module including at least one actuator is electrically connected between the step-up/step-down converter and the storage module.

A significant advantage of the arrangement according to the present invention may be seen in the fact that, in the case of a fault, the storage module may be disconnected from the step-up/step-down converter with the aid of the actuator, and it may thus be prevented that the energy stored in the storage module is able to feed a fault location in the step-up/step-down converter or in a module of the arrangement which is upstream of the step-up/step-down converter, and is able to result in additional damage or total destruction of the arrangement. In other words, the protective module is able to protect the arrangement from internal destruction via the energy in the storage module, after a fault has been detected and, for example, a disconnection of the arrangement from an external power distribution network has just taken place, and feeding the fault location externally via the power distribution network has just been prevented. The protective module thus prevents an internal feed of the fault location and is able to assist safety devices which are provided for disconnecting the arrangement from an external power distribution network and for preventing an external feed of the fault location.

The arrangement is preferably a converter arrangement, in particular a converter arrangement in the form of a multi-level converter.

Preferably, the actuator or one of the actuators of the protective module is an electrical switch which is electrically arranged in such a way that, in the activated state, it short-circuits a first and a second input terminal via which the protective module is connected to the step-up/step-down converter, and/or it short-circuits a first and a second output terminal via which the protective module is connected to the storage module.

According to a preferred embodiment variant of the arrangement, it is provided that the protective module has a first and a second input terminal for connecting to the step-up/step-down converter, and at least two actuators, of which one actuator is connected between the first input terminal of the protective module and an internal terminal of the protective module, and one actuator is connected between the internal terminal of the protective module and the second input terminal.

According to an additional preferred embodiment variant of the arrangement, it is provided that the protective module has a first and a second output terminal for connecting to the storage module, and at least two actuators, of which one actuator is connected between the first output terminal of the protective module and an internal terminal of the protective module, and one actuator is connected between the internal terminal of the protective module and the second output terminal.

It is considered to be particularly advantageous if the protective module has a first and a second input terminal for connecting to the step-up/step-down converter, and has a first and a second output terminal for connecting to the storage module, and the second input terminal and the second output terminal are connected.

Preferably, the protective module has at least three actuators, of which a first actuator is connected between an internal terminal of the protective module and the second input terminal of the protective module, a second actuator is connected between the first output terminal of the protective module and the internal terminal of the protective module, and a third actuator is connected between the first input terminal of the protective module and the internal terminal of the protective module.

The first actuator is preferably a switch. With a view to short switching times and reliable activation or reliable closing, it is considered to be advantageous if the first actuator is an irreversibly switching switch, in particular a pyrotechnically driven switch.

The second and/or third actuator preferably has a fuse or is formed by such a fuse.

With a view to particularly reliable protection of the arrangement, it is considered to be advantageous if the protective module has a triggering unit which generates a trigger signal for activating or electrically closing at least one of the actuators, in particular the first actuator, if at least one electrical value, in particular a measured value, indicates a fault, in particular reaches or exceeds a predefined threshold.

Preferably, the triggering unit is designed in such a way that it generates the trigger signal if the magnitude of the current at the first or second input terminal of the protective module reaches or exceeds a predefined first current threshold, the magnitude of the current at the first or second output terminal of the protective module reaches or exceeds a predefined second current threshold, and/or the magnitude of the voltage between the first and second output terminals of the protective module reaches or exceeds a predefined voltage threshold.

It is also advantageous if the triggering unit is designed in such a way that it activates at least one switch in the upstream step-up/step-down converter if the magnitude of the current at the first or second input terminal of the protective module reaches or exceeds the first current threshold.

In addition, the present invention relates to a method for operating an arrangement which comprises at least one series circuit including at least two series-connected submodules and an inductor.

With respect to such a method, it is provided according to the present invention that at least one of the submodules of one or a plurality of the series circuits comprises a step-up/step-down converter and a storage module, and a protective module including at least one actuator is electrically connected between the step-up/step-down converter and the storage module, and the protective module disconnects the step-up/step-down converter from the storage module if at least one electrical value indicates a fault.

With respect to the advantages of the method according to the present invention, reference is made to the above embodiments in conjunction with the arrangement according to the present invention.

BRIEF DESCRIPTION OF THE SEVERAL VIEWS OF THE DRAWING

The present invention will be described in greater detail below based on exemplary embodiments; the following are shown by way of example:

FIG. 9 shows an exemplary embodiment of a protective module which may be used in the submodule according to FIG. 4;

FIG. 10 shows an exemplary embodiment of a triggering unit for the protective module according to FIG. 9;

FIG. 11 shows an exemplary embodiment of a converter device which may be used in the arrangement according to FIG. 1 and which has a star connection;

DESCRIPTION OF THE INVENTION

Figure 1:
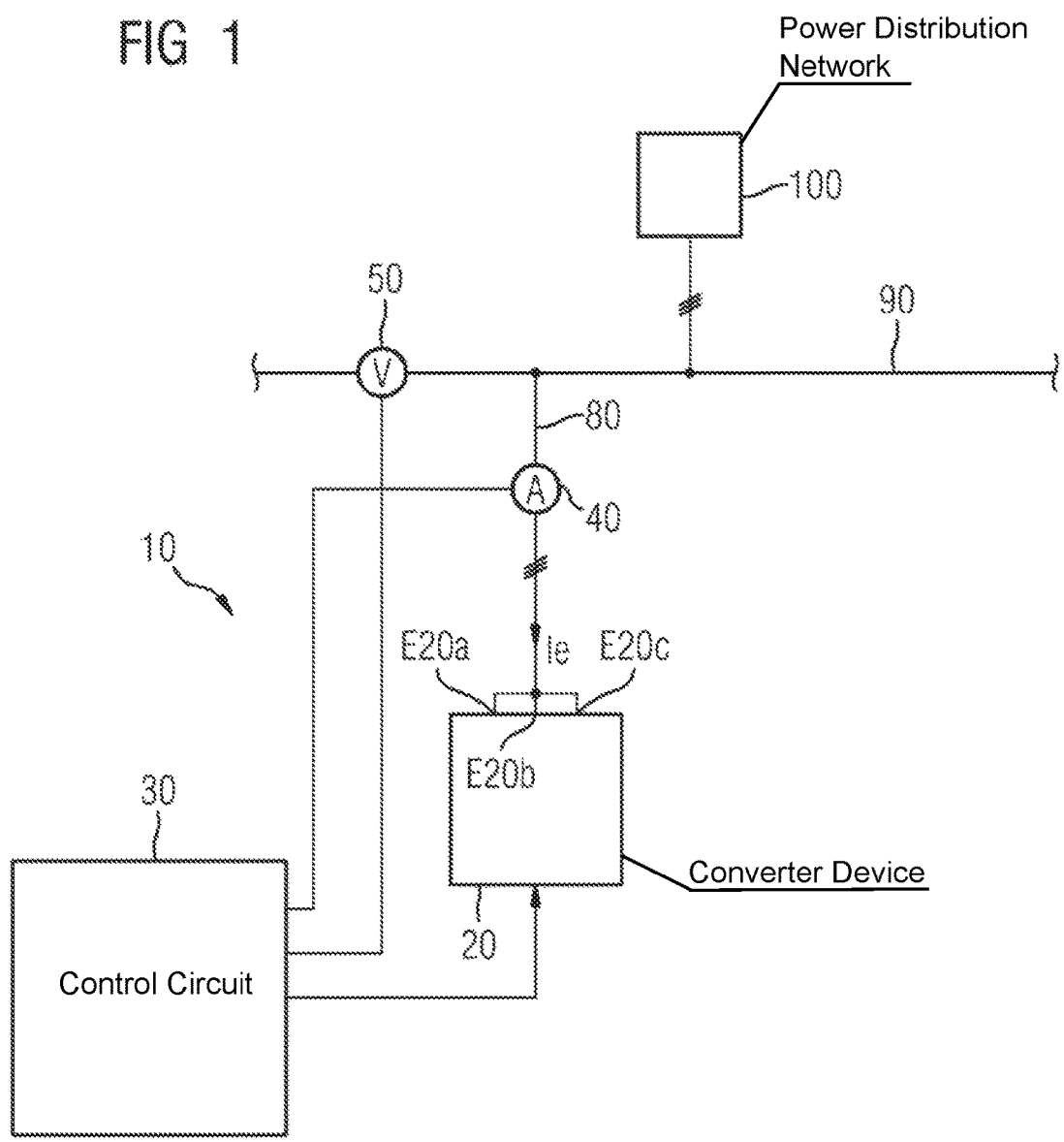
FIG. 1 shows an exemplary embodiment of an arrangement according to the present invention.

For the sake of clarity, in the figures, the same reference characters are always used for identical or comparable components.

FIG. 1 shows an arrangement 10 which comprises a converter device 20, a control circuit 30, a current sensor 40, and a voltage sensor 50.

The converter device 20 has three alternating-current input terminals E20a, E20b, and E20c, which are connected to a three-phase electrical line 80. Via the three-phase line 80, the converter device 20 is connected to a terminal busbar 90 and a power distribution network 100 which is only schematically indicated.

The arrangement 10 according to FIG. 1 may, for example, be operated as follows:

By means of the current sensor 40, the control circuit 30 measures the three-phase input alternating current Ie flowing on the input side into the converter device 20 (or flowing out of it), and, via the voltage sensor 50, measures the three-phase input voltage which is present at the converter device 20, and determines the state of the power distribution network 100 via the measured values. In addition, said control circuit ascertains the operating state of the converter device 20 based on measured values which are detected inside the converter device 20 by current and/or voltage sensors which are not shown further.

With the aid of the measured values, the control circuit 30 ascertains an optimal control of the converter device 20 in such a way that the power distribution network 100 assumes a most optimal network state, and the converter device 20 is in an advantageous operating state in which power may be provided or consumed at any time.

Figure 2:
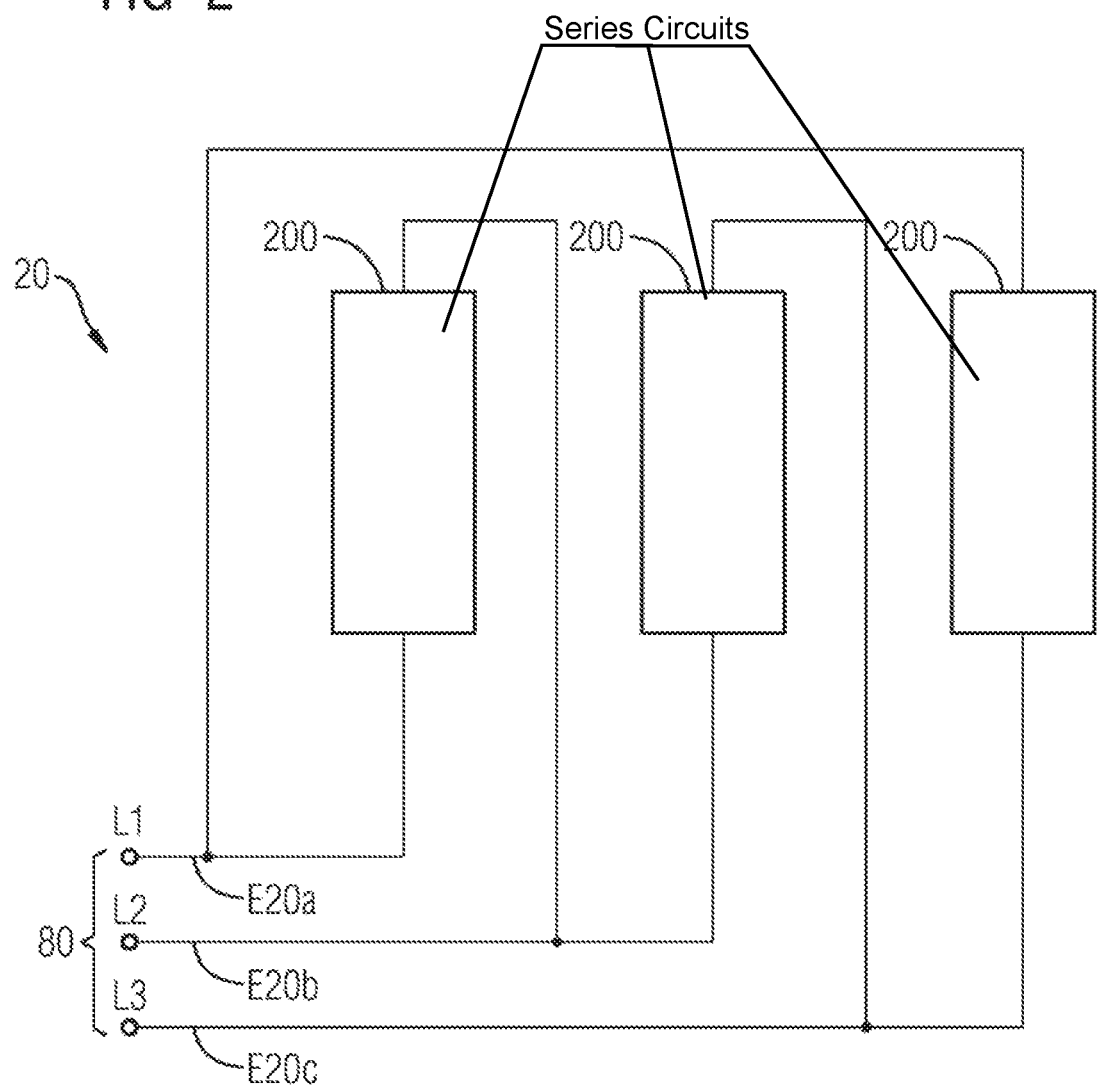
FIG. 2 shows an exemplary embodiment of a converter device which may be used in the arrangement according to FIG. 1 and which has a delta configuration.

FIG. 2 shows an exemplary embodiment of a converter device 20 which may be used in the arrangement 10 according to FIG. 1. The three alternating-current voltage input terminals E20a, E20b, and E20c are shown, which are connected to the three-phase line 80 according to FIG. 1. The three phases of the three-phase line 80 are indicated in FIG. 2 by the reference characters L1, L2, and L3.

The converter device 20 has three delta-connected series circuits 200, the series-connected components of which are not depicted in greater detail in FIG. 2 for reasons of clarity.

Figure 3:
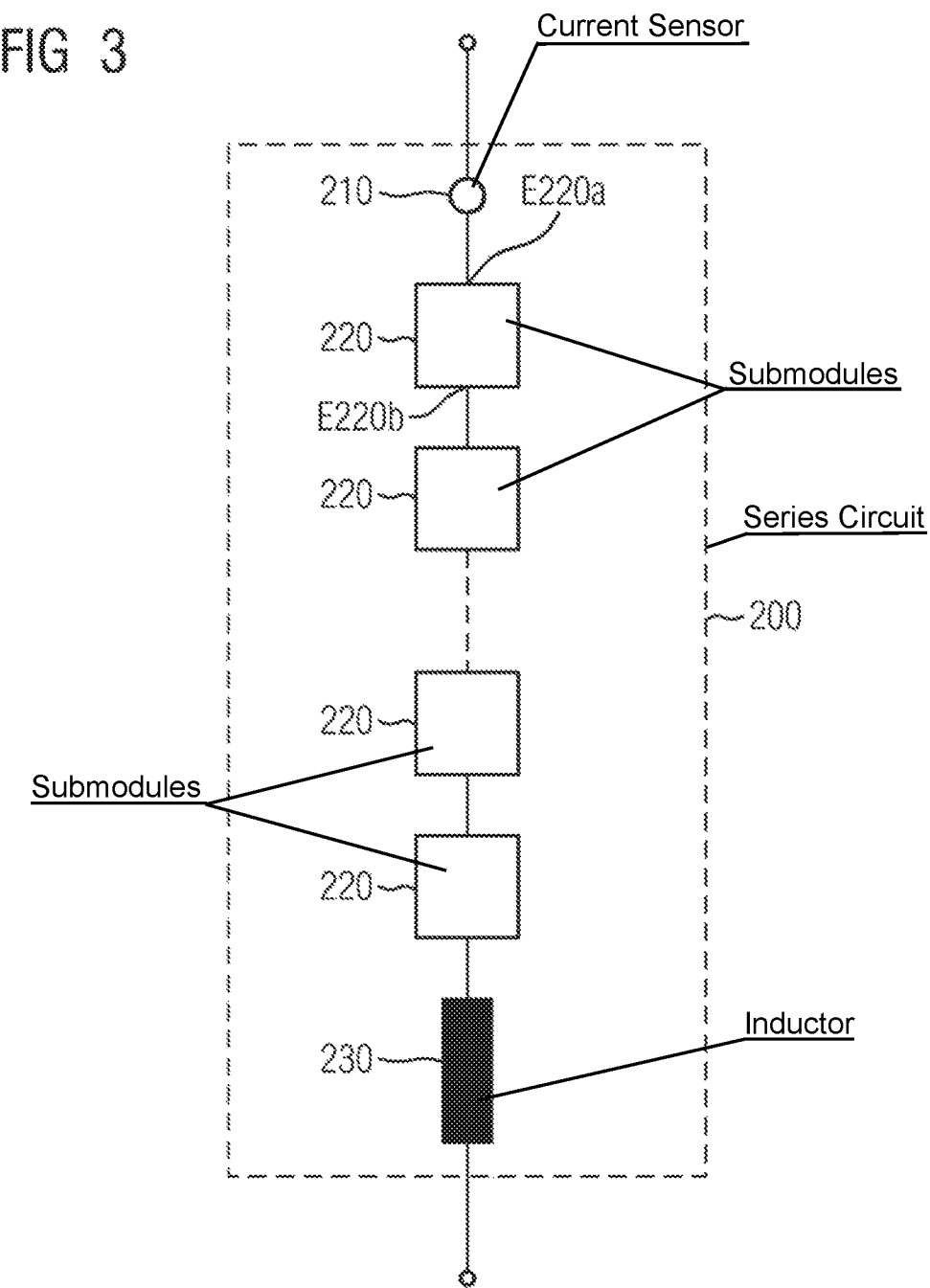
FIG. 3 shows an exemplary embodiment of a series circuit which includes multiple submodules and which may be used in the converter device according to FIG. 2.

FIG. 3 shows an exemplary embodiment of a series circuit 200 which may be used in the converter device 20 according to FIG. 2. The series circuit 200 according to FIG. 3 has a current sensor 210 which is preferably connected to the control circuit 30 according to FIG. 1, a plurality of submodules 220, and an inductor 230. The current sensor 210, the submodules 220, and the inductor 230 are electrically connected in series. The series connection of the submodules 220 takes place via the input terminals E220a and E220b.

Figure 4:
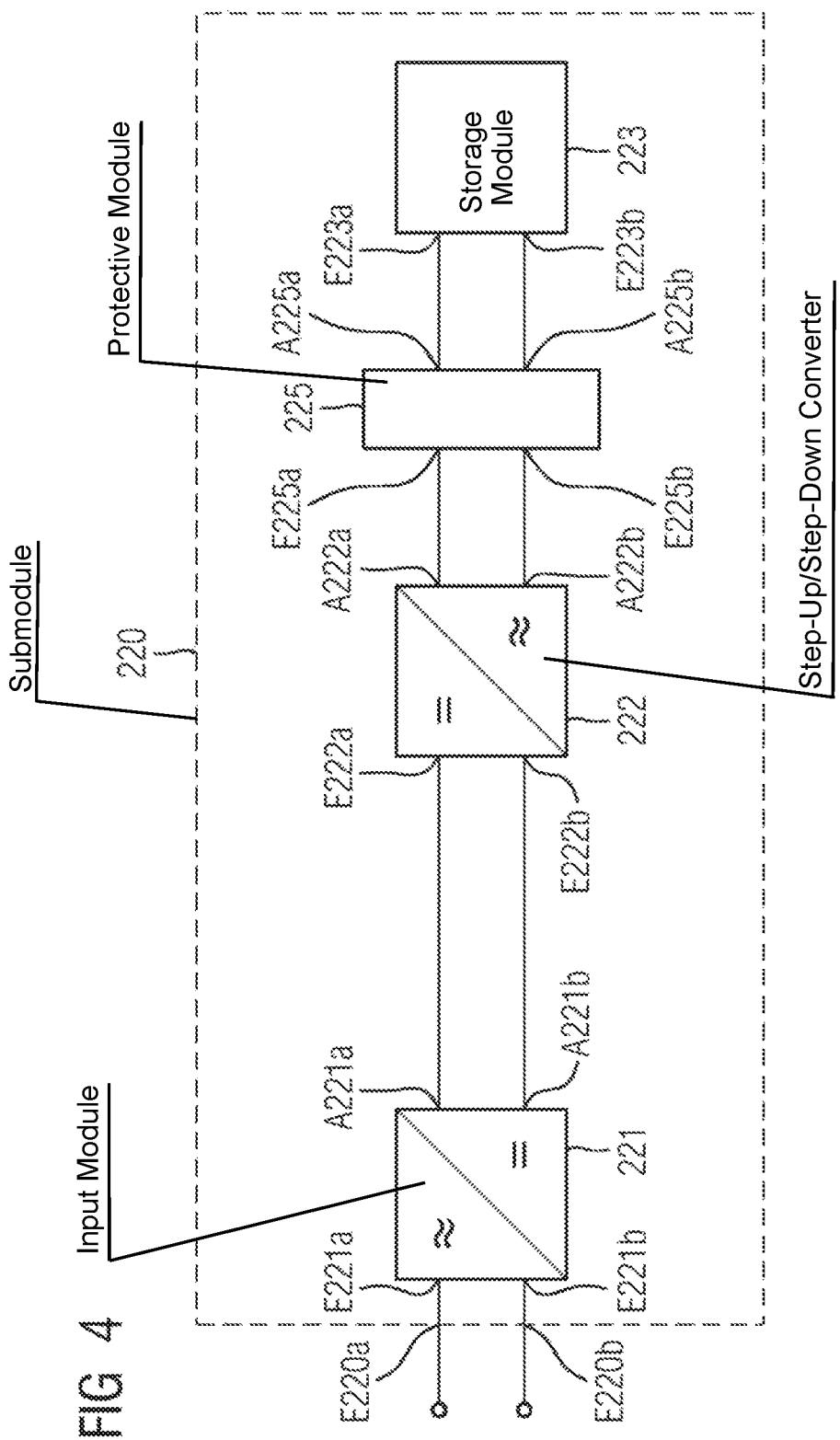
FIG. 4 shows an exemplary embodiment of a submodule which may be used in the series circuit according to FIG. 3.

FIG. 4 shows an exemplary embodiment of a submodule 220 which may be used in the series circuit 200 according to FIG. 3. The submodule 220 comprises an input module 221 which is a converter module for AC/DC (alternating current/direct current) conversion, a step-up/step-down converter 222, a storage module 223, and a protective module 225 which is connected between the step-up/step-down converter 222 and the storage module 223.

The input module 221, the step-up/step-down converter 222, the protective module 225, and the storage module 223 are cascaded in succession. This means that the outputs A221a and A221b of the input module 221 are connected to the inputs E222a and E222b of the step-up/step-down converter 222, and the outputs A222a and A222b of the step-up/step-down converter 222 are connected to the inputs E225a and E225b of the protective module 225, and the outputs A225a and A225b of the protective module 225 are connected to the inputs E223a and E223b of the storage module 223. The inputs E221a and E221b of the input module 221 according to FIG. 4 form the inputs E220a and E220b of the submodule 220, which are connected in series to the inputs E221a and E221b of input modules 221 of upstream and downstream submodules 220 (cf. FIG. 3) for forming the series connection of the submodules 220 (cf. FIG. 3).

As an energy store, the storage module 223 preferably has one or multiple double-layer capacitors which are not depicted in greater detail in FIG. 4 for reasons of clarity.

Figure 5:
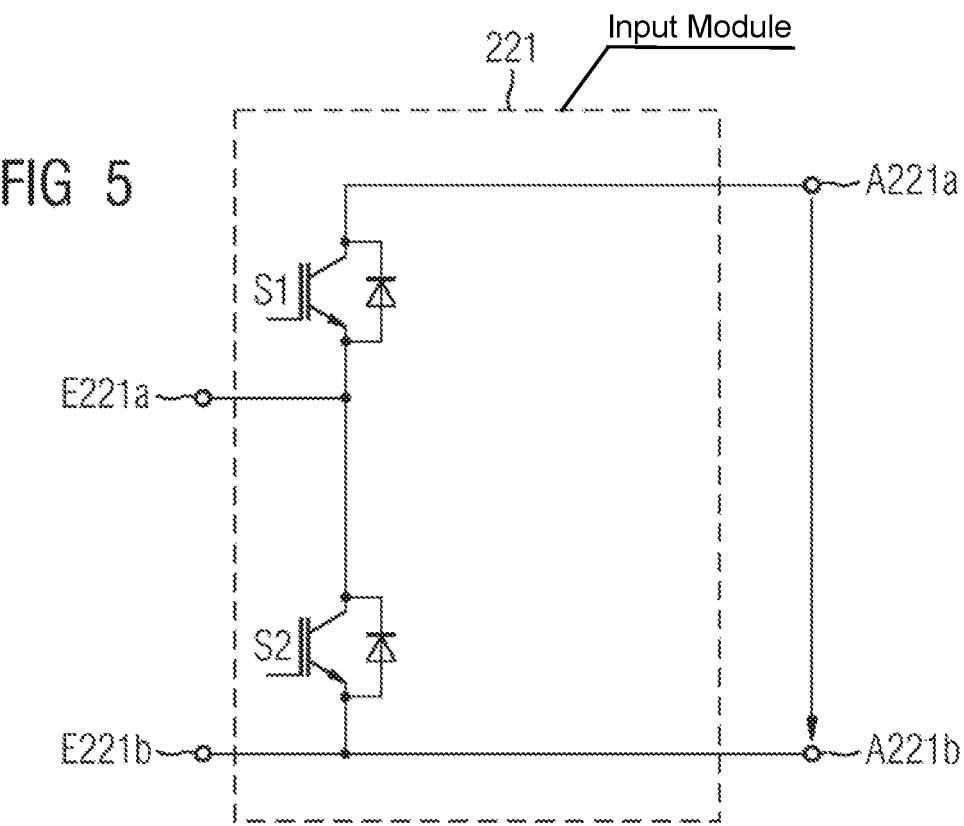
FIG. 5 shows an exemplary embodiment of an input module which may be used in the submodule according to FIG. 4.

FIG. 5 shows an exemplary embodiment of an input module 221 which may be used in the submodule 220 according to FIG. 4. The input module 221 comprises two switching elements S1 and S2, to which a diode is connected in parallel in each case. The switching elements S1 and S2 may, for example, be semiconductor switches, for example, in the form of transistors. The outputs of the input module 221 are indicated in FIGS. 4 and 5 by the reference characters A221a and A221b and are connected to the inputs E222a and E222b of the downstream step-up/step-down converter 222.

The control of the switching elements S1 and S2 of the input module 221 preferably takes place via the control circuit 30 according to FIG. 1, as a function of the current and voltage values which the control circuit 30 detects and evaluates.

Figure 6:
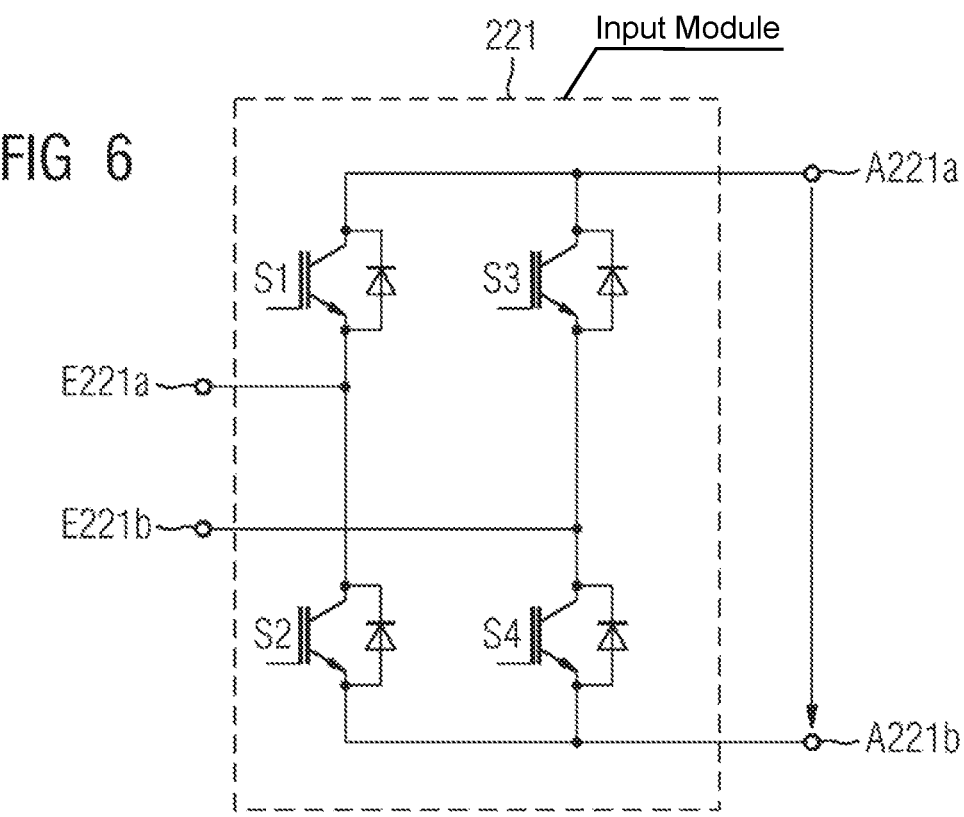
FIG. 6 shows an additional exemplary embodiment of an input module which may be used in the submodule according to FIG. 4.

FIG. 6 shows an additional exemplary embodiment of an input module 221 which may be used in the submodule 220 according to FIG. 4. The input module 221 comprises four switching elements S1, S2, S3, and S4, to which a diode is connected in parallel in each case. The four switching elements S1 to S4 are interconnected in the form of a H bridge circuit and are preferably controlled by the control circuit 30 according to FIG. 1, as a function of the current and voltage values which are supplied by the two sensors 40 and 50 and the remaining sensors already mentioned but not shown in greater detail. The outputs of the input module 221 are indicated in FIGS. 4 to 6 by the reference characters A221a and A221b and are connected to the inputs E222a and E222b of the downstream step-up/step-down converter 222.

Figure 7:
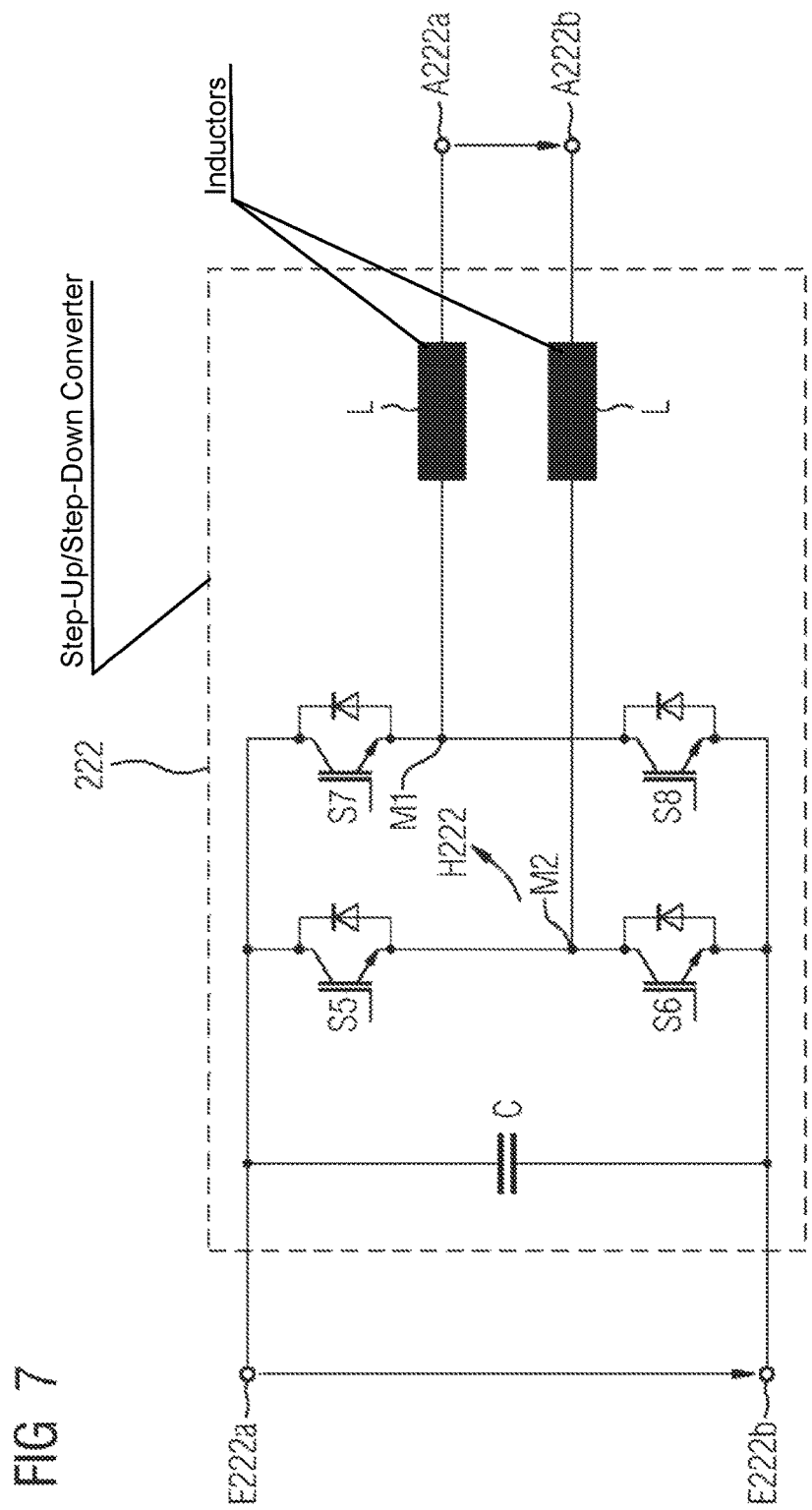
FIG. 7 shows an exemplary embodiment of a step-up/step-down converter which may be used in the submodule according to FIG. 4.

FIG. 7 shows an exemplary embodiment of a step-up/step-down converter 222 which may be used in the submodule 220 according to FIG. 4. The step-up/step-down converter 222 according to FIG. 7 has four switching elements S5, S6, S7, and S8, to which a diode is connected in parallel in each case. The four switching elements S5, S6, S7, and S8 are connected in the form of an H bridge circuit H222, the outer terminals of which form the inputs E222a and E222b of the step-up/step-down converter 222.

A capacitor C is connected in parallel with the H bridge circuit H222 and is thus also in parallel with the input terminals E222a and E222b of the step-up/step-down converter 222.

Center terminals M1 and M2 of the H bridge circuit H222 are connected to the output terminals A222a and A222b of the step-up/step-down converter 222 via an inductor L in each case, preferably in the form of a choke. Alternatively, in addition, only one of the two center terminals M1 or M2 of the H bridge circuit H222 may be connected to the respective output terminal A222a or A222b of the step-up/step-down converter 222 via an inductor L, preferably in the form of a choke.

The output terminals A222a and A222b of the step-up/step-down converter 222 are connected to the input terminals E225a and E225b of the downstream protective module 225 (cf. FIG. 4).

The control of the four switching elements S5, S6, S7, and S8 preferably takes place via the control circuit 30 according to FIG. 1, as a function of the measured values which are supplied by the two sensors 40 and 50 and the remaining sensors already mentioned but not shown in greater detail.

Figure 8:
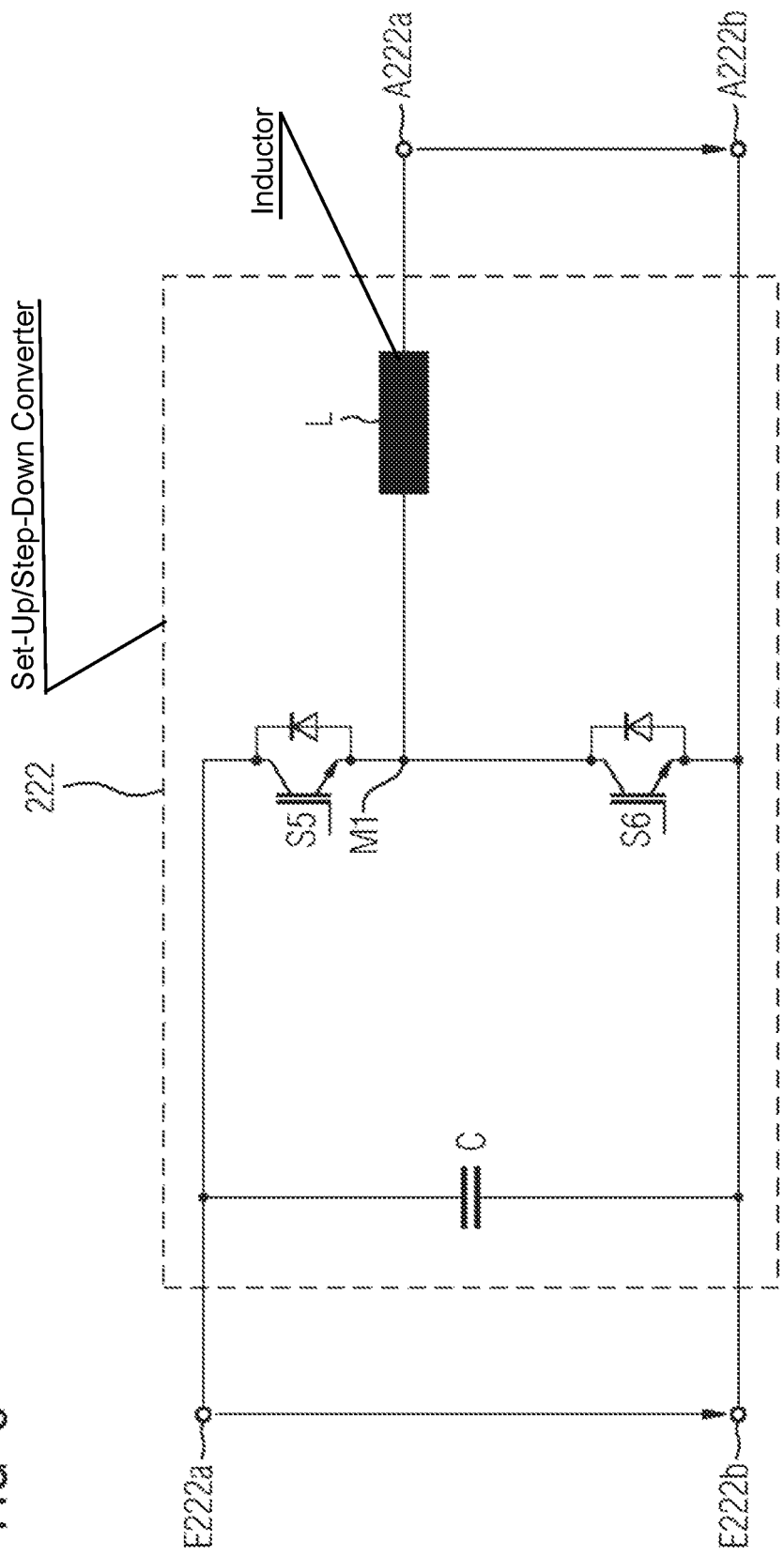
FIG. 8 shows an additional exemplary embodiment of a step-up/step-down converter which may be used in the submodule according to FIG. 4.

FIG. 8 shows an additional exemplary embodiment of a step-up/step-down converter 222 which may be used in the submodule 220 according to FIG. 4. The step-up/step-down converter 222 according to FIG. 8 has two switching elements S5 and S6, to which a diode is connected in parallel in each case. The two switching elements S5 and S6 are connected in series.

A capacitor C is connected in parallel with the series circuit of the switching elements S5 and S6 and is thus also in parallel with the input terminals E222a and E222b of the step-up/step-down converter 222.

A center terminal M1 of the series circuit is connected to the output terminal A222a of the step-up/step-down converter 222 via an inductor L, preferably in the form of a choke.

The output terminals A222a and A222b of the step-up/step-down converter 222 are connected to the input terminals E225a and E225b of the downstream protective module 225 (cf. FIG. 4).

The control of the two switching elements S5 and S6 takes place preferably via the control circuit 30 according to FIG. 1, as a function of the measured values which are supplied by the two sensors 40 and 50 and the remaining sensors already mentioned but not shown in great detail.

FIG. 9 shows an exemplary embodiment of a protective module 225 which may be used in the submodule 220 according to FIG. 4.

The protective module 225 has three actuators A1, A2, and A3, of which a first actuator A1 is connected between an internal terminal Q225 of the protective module 225 and the lower input terminal E225b of the protective module 225 in FIG. 9, a second actuator A2 is connected between the upper output terminal A225a of the protective modules 225 in FIG. 9 and the internal terminal Q225 of the protective module 225, and a third actuator A3 is connected between the upper input terminal E225a of the protective module 225 in FIG. 9 and the internal terminal Q225 of the protective module 225.

The first actuator A1 is a switch, preferably an irreversibly switching switch, in particular a pyrotechnically driven switch.

The second and third actuators A2 and A3 are preferably fuses.

In addition, the protective module 225 has a current sensor 500 for measuring the current I225e at the input terminal E225a of the protective module 225, a current sensor 510 for measuring the current I225a at the output terminal A225a of the protective module 225, and a voltage sensor 530 for measuring the voltage U225 between the output terminals A225a and A225b of the protective module 225.

In addition, the protective module 225 is equipped with a triggering unit 540 which generates a trigger signal ST1 for activating or electrically closing the first actuator A1 if at least one of the measured values of the current sensor 500, the current sensor 510, or the voltage sensor 530 indicates a fault, in particular reaches or exceeds a predefined threshold.

The triggering unit 540 is preferably designed in such a way that it generates the trigger signal ST1 if the magnitude of the current I225e reaches or exceeds a predefined first current threshold, the magnitude of the current I225a reaches or exceeds a predefined second current threshold, and/or the magnitude of the voltage U225 between the first and second output terminals of the protective module 225 reaches or exceeds a predefined voltage threshold.

In the exemplary embodiment according to FIG. 9, the triggering unit 540 is preferably also designed in such a way that it generates a trigger signal ST2 if the magnitude of the current I225e reaches or exceeds the predefined first current threshold. The triggering unit 540 transmits the trigger signal ST2 to the upstream step-up/step-down converter 222 and thus activates its switching element S6 in the case of the step-up/step-down converter 222 according to FIG. 8, or its switching elements S6 and S8 in the case of the step-up/step-down converter 222 according to FIG. 7.

FIG. 10 shows an exemplary embodiment of a triggering unit 540 according to FIG. 9 in greater detail. Three absolute-value generators 550, 551, and 552 are shown, on the input side of which measured values Mw1, Mw2, and Mw3 are present. The measured value Mw1 is generated by the current sensor 500 (cf. FIG. 9) and indicates the magnitude of the current I225e; the measured value Mw2 is generated by the current sensor 510 and indicates the magnitude of the current I225a; and the measured value Mw3 is generated by the voltage sensor 530 and indicates the magnitude of the voltage U225.

The three absolute-value generators 550, 551 and 552 form the magnitudes from the measured values Mw1 to Mw3 and pass them to the downstream comparators 560, 561, and 562. The comparators 560, 561, and 562 generate a logical "one" on the output side in each case, if the magnitude present on the input side reaches or exceeds a predefined threshold; otherwise, a logical "zero" is generated. The output signal of the comparator 560 directly forms the aforementioned trigger signal ST2 for activating or electrically closing switching elements of the upstream step-up/step-down converter 222.

Downstream of the comparators 560, 561, and 562 is an OR gate 570, at which the logical output signals of the comparators 560, 561, and 562 are present on the input side. The OR gate 570 generates a logical "one" and thus the trigger signal ST1 for activating or electrically closing the first actuator A1, if at least one logical "one" is present on the input side, i.e., if at least one of the measured values of the current sensor 500, the current sensor 510, or the voltage sensor 530 indicates a fault, in particular reaches or exceeds a predefined threshold.

FIG. 11 shows an additional exemplary embodiment of a converter device 20 which may be used in the arrangement 10 according to FIG. 1. Unlike the exemplary embodiment according to FIG. 2, the series circuits 200 of the converter device 20 are not interconnected in a delta configuration, but rather in a star configuration, thus forming a star connection. The neutral point formed by the interconnection is indicated in FIG. 11 by the reference characters ST. A return line N, for example, the return line of the three-phase line 80 according to FIG. 1, may be connected to the neutral point ST.

The configuration of the series circuits 200 is not depicted in greater detail in FIG. 11 for reasons of clarity. The series circuits 200 may, for example, correspond to the series circuits 200 of the converter device 20 according to FIG. 2, or may be configured in such a way as has been described above in detail by way of example in conjunction with FIGS. 3 to 8. With respect to the configuration of the series circuits 200 according to FIG. 11, the above embodiments apply accordingly.

Figure 12:
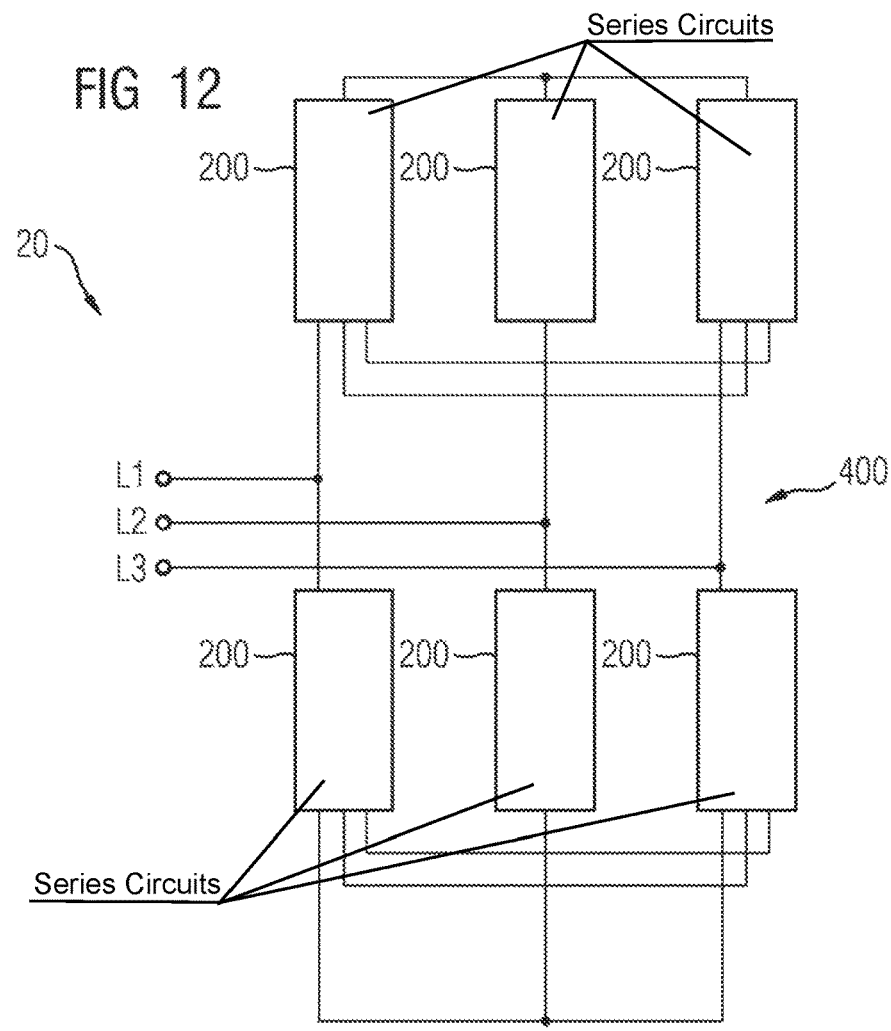
FIG. 12 shows an exemplary embodiment of a converter device which may be used in the arrangement according to FIG. 1 and which has a bridge connection.

FIG. 12 shows an exemplary embodiment of a converter device 20 in which series circuits 200, which respectively include at least two series-connected submodules which are not shown for reasons of clarity in FIG. 12, form a bridge circuit 400.

The configuration of the series circuits 200 of the converter device 20 may, for example, correspond to the configuration of the series circuits 200, as has been described above in detail in conjunction with FIGS. 2 to 8.

Figure 13:
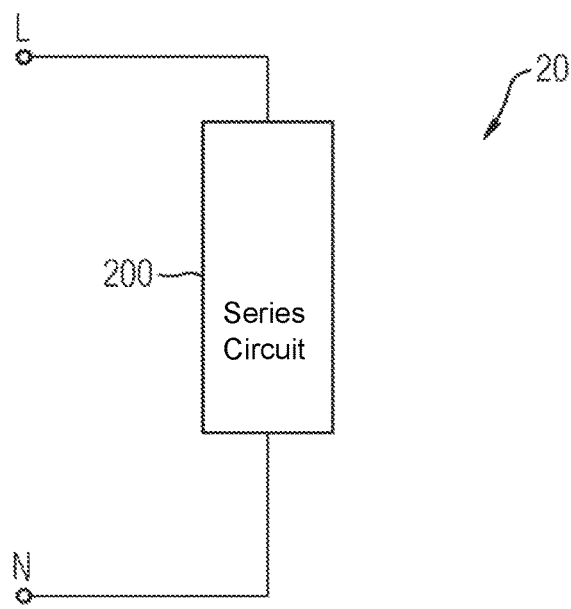
FIG. 13 shows an exemplary embodiment of a single-phase converter device which may be used in a single-phase arrangement.

FIG. 13 shows an exemplary embodiment of a single-phase converter device 20 which comprises a series circuit 200 including a plurality of series-connected submodules which are not depicted in greater detail in FIG. 13 for reasons of clarity. The configuration of the series circuit 200 of the arrangement 20 according to FIG. 13 may correspond to the series circuits 200 as have been described above in detail in conjunction with FIGS. 2 to 8.

The converter device 20 or the series circuit 200 may be connected to a single-phase AC voltage network (as shown) or alternatively to a DC voltage network, for example, to a DC voltage circuit of a high-voltage direct-current (HVDC) transmission facility. In the latter case, the input module 221 is preferably a DC/DC converter or a DC voltage/DC voltage converter.

Although the present invention has been illustrated and described in greater detail via preferred exemplary embodiments, the present invention is not limited by the disclosed examples, and other variations may be derived from it by those skilled in the art, without departing from the protective scope of the present invention.

LIST OF REFERENCE CHARACTERS

10 Arrangement
20 Converter device
30 Control circuit
40 Current sensor
50 Voltage sensor
80 Electrical line
90 Terminal busbar
100 Power distribution network
110 Direct-current electrical line
200 Series circuit
210 Current sensor
220 Submodules
221 Input module
222 Step-up/step-down converter
223 Storage module
225 Protective module
230 Inductor
400 Bridge circuit
500 Current sensor
510 Current sensor
530 Voltage sensor
540 Triggering unit
550 Absolute-value generator
551 Absolute-value generator
552 Absolute-value generator
560 Comparator
561 Comparator
562 Comparator
570 OR gate
A1 Actuator
A2 Actuator
A3 Actuator
A221a Output terminal of the input module
A221b Output terminal of the input module
A222a Output terminal of the step-up/step-down converter
A222b Output terminal of the step-up/step-down converter
A225a Output terminal of the protective module
A225b Output terminal of the protective module
C Capacitor
E20a AC voltage input terminal
E20b AC voltage input terminal
E20c AC voltage input terminal
E220a Input terminal of the submodule
E220b Input terminal of the submodule
E221a Input terminal of the input module E221b Input terminal of the input module
E222a Input terminal of the step-up/step-down converter
E222b Input terminal of the step-up/step-down converter
E223a Input terminal of the storage module
E223b Input terminal of the storage module
H222 H bridge circuit
E225a Input terminal of the protective module
E225b Input terminal of the protective module
I225e Current
I225a Current
Ie Input alternating current
L Inductor
L1 Phase
L2 Phase
L3 Phase
M1 Center terminal
M2 Center terminal
Mw1 Measured value
Mw2 Measured value
Mw3 Measured value
N Return line
Q225 Internal terminal of the protective module
ST Neutral point
ST1 Trigger signal
ST2 Trigger signal
S1 Switching element
S2 Switching element
S3 Switching element
S4 Switching element
S5 Switching element
S6 Switching element
S7 Switching element
S8 Switching element
U225 Voltage

The invention claimed is:

1. An arrangement, comprising:
at least one series circuit including at least two series-connected sub modules and an inductor;
at least one of said at least two series-connected sub modules of said at least one series circuit including a step-up/step-down converter, a storage module, and a protective module including at least one actuator electrically connected between said step-up/step-down converter and said storage module;
said protective module having first and second input terminals to be connected to said step-up/step-down converter and first and second output terminals to be connected to said storage module, and said second input terminal and said second output terminal being interconnected;
said at least one actuator of said protective module including at least first, second and third actuators and an internal terminal;
said first actuator connected between said internal terminal and said second input terminal of said protective module;
said second actuator connected between said first output terminal and said internal terminal of said protective module; and
said third actuator connected between said first input terminal and said internal terminal of said protective module.

2. The arrangement according to claim 1, wherein:
said first and second input terminals of said protective module connect said protective module to said step-up/step-down converter and said first and second output terminals of said protective module connect said protective module to said storage module; and
said first actuator is an electrical switch being electrically disposed to short-circuit at least one of said first and second input terminals or said first and second output terminals in an activated state.

3. The arrangement according to claim 1, wherein said first actuator is a switch.

4. The arrangement according to claim 1, wherein said first actuator is an irreversibly switching switch or a pyrotechnically driven switch.

5. The arrangement according to claim 1, wherein said second actuator is a fuse.

6. The arrangement according to claim 1, wherein said third actuator is a fuse.

7. The arrangement according to claim 1, wherein said protective module has a triggering unit generating a trigger signal for activating or electrically closing said at least one actuator if at least one electrical value or a measured value indicates a fault or reaches or exceeds a predefined threshold.

8. The arrangement according to claim 1, wherein:
said protective module has a triggering unit generating a trigger signal for activating or electrically closing said at least one actuator if at least one electrical value or a measured value indicates a fault or reaches or exceeds a predefined threshold, and said triggering unit generates said trigger signal if at least one of:
a magnitude of a current at said first or second input terminal of said protective module reaches or exceeds a predefined first current threshold,
a magnitude of a current at said first or second output terminal of said protective module reaches or exceeds a predefined second current threshold, or
a magnitude of a voltage between said first and second output terminals of said protective module reaches or exceeds a predefined voltage threshold.

9. The arrangement according to claim 8, wherein:
said step-up/step-down converter has at least one switch; and
said triggering unit activates said at least one switch in said step-up/step-down converter if a magnitude of a current at said first or second input terminal of said protective module reaches or exceeds said first current threshold.

* * * * *